G. L. KAVANAGH.
VEHICLE TIRE.
APPLICATION FILED JUNE 9, 1917.

1,300,732.

Patented Apr. 15, 1919.
2 SHEETS—SHEET 1.

Inventor
George L. Kavanagh
By Fetherstonhaugh & Co
Attys.

UNITED STATES PATENT OFFICE.

GEORGE L. KAVANAGH, OF MONTREAL, QUEBEC, CANADA.

VEHICLE-TIRE.

1,300,732.   Specification of Letters Patent.   Patented Apr. 15, 1919.

Application filed June 9, 1917. Serial No. 173,773.

*To all whom it may concern:*

Be it known that I, GEORGE L. KAVANAGH, a citizen of the United States, and resident of the city of Montreal, in the Province of Quebec and Dominion of Canada, have invented certain new and useful Improvements in Vehicle-Tires, of which the following is a full, clear, and exact description.

This invention relates to improvements in vehicle tires, and the object of the invention is to provide a non-pneumatic tire of great resiliency and durability.

A further object is to provide a tire which is so constructed that it is braced against lateral stress.

The device consists essentially of a casing having on the inner surface thereof a number of integral ribs, which when the tire is in place on a wheel abut one another. One of these ribs or projections, which is centrally disposed in the tire, forms a backbone against which the other ribs abut. This backbone may be free at one edge or may be extended to engage between the edges of the casing.

In the drawings which illustrate the invention:—

Figs. 3 to 7 inclusive illustrate various modifications of the invention.

Figure 1:
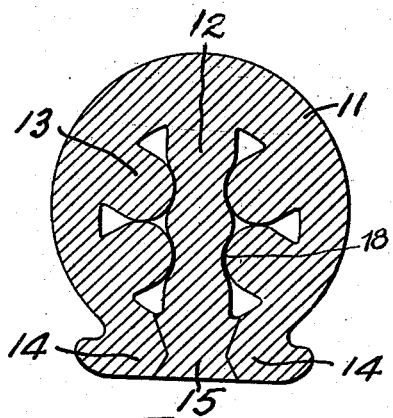
Figure 1 is a cross sectional view of the preferred form of tire.
Figure 2:
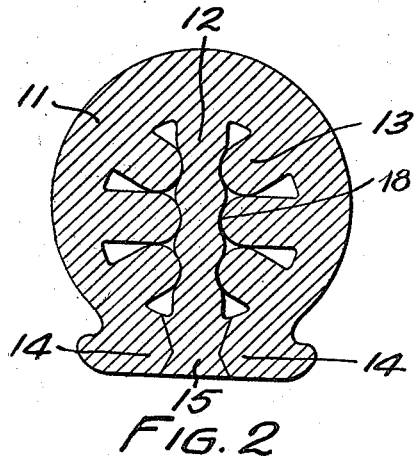
Fig. 2 shows a tire similar to Fig. 1, but having a larger number of ribs.
Figure 3:
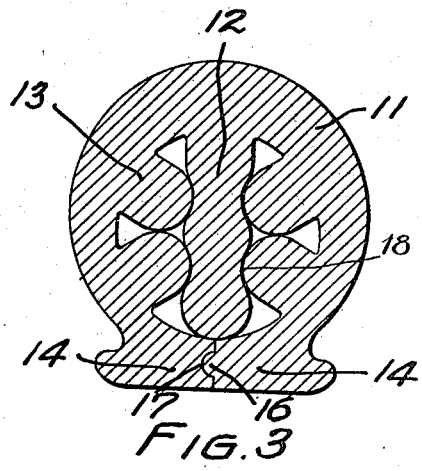
Figure 4:
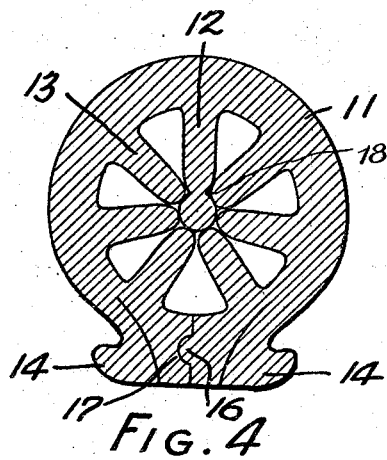
Figure 5:
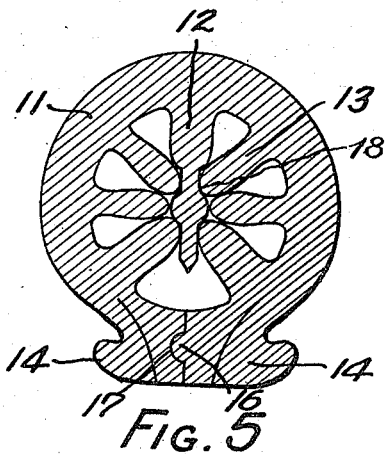
Figure 6:
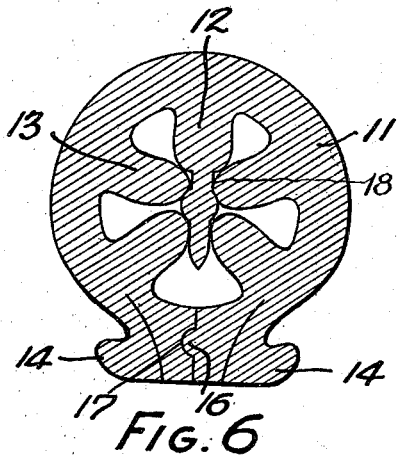
Figure 7:
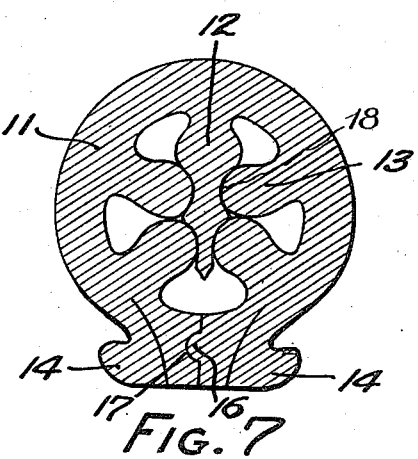

Referring more particularly to the drawings, 11 designates a casing of any suitable form having ribs 12 and 13 projecting from the inner surface thereof formed integral with the casing. One of these ribs, namely, that designated 12, springs from the casing at a point intermediate the edges 14 and is considerably longer than the projections 13. This rib 12 may be provided with a terminal portion 15 adapted to engage between and be held in place by the edges 14 of the casing, as shown in Figs. 1 and 2. As shown in Figs. 3 to 7 inclusive, the rib 12 does not engage between the edges of the casing, and is formed of various lengths, according to the various modifications. In these latter figures, the casing is provided with a bead 16 on one edge adapted to enter a groove 17 on the opposite edge, so as to form a grit and moisture tight joint. The central rib or backbone 12 is preferably provided with grooves or depressions 18 for the reception of the free edges of the ribs 13 so as to hold the ribs against slipping and permit the transmission of load from the backbone to the ribs 13.

When the tire is in use, the load is transmitted to the backbone, and by it through the ribs 13 to the casing. The tendency of the backbone to buckle is resisted by the support imparted to it by the ribs, so that the ribs transmit certain force to the casing, with the result that the load is distributed throughout the casing, and all the ribs are more or less in compression. The disposition of the ribs is such that they brace one another, and the central rib, so that the tire will stand up satisfactorily against lateral stresses.

Having thus described my invention, what I claim is:—

1. In a tire, a casing, a series of ribs formed integral therewith, and projecting from the inner surface thereof, one of said ribs being located mid-way between the edges of the casing and formed longer than the remaining ribs and having grooves formed therein for the reception of the remaining ribs.

2. In a tire, a casing, a plurality of ribs formed integral therewith and projecting from the inner surface thereof, one of said ribs being located mid-way between the edges of the casing and having its free edge adapted for interlocking engagement with the edges of the casing and having its sides grooved to receive the free edges of the other ribs.

3. In a tire, a casing, a main rib having depressions therein, and radially located ribs in transverse section supportingly seated in the depressions in said main rib.

4. In a tire, a casing, a main rib, radially disposed ribs extending inwardly from the casing and having their inner edges supported by said main rib, an integral means on said main rib for maintaining said radial ribs in proper supporting position.

In witness whereof, I have hereunto set my hand.

GEORGE L. KAVANAGH.

Copies of this patent may be obtained for five cents each, by addressing the "Commissioner of Patents, Washington, D. C."